United States Patent [19]

Schlachter

[11] 3,996,726
[45] Dec. 14, 1976

[54] PACKAGING MACHINE

[75] Inventor: Kurt Schlachter, Wallau, Lahn, Germany

[73] Assignee: Kramer & Grebe GmbH & Co. KG Maschinen- und Modellfabrik, Wallau, Lahn, Germany

[22] Filed: Feb. 12, 1976

[21] Appl. No.: 657,589

Related U.S. Application Data

[63] Continuation-in-part of Ser. No. 591,862, June 30, 1975, abandoned.

[52] U.S. Cl. .................................. 53/112 A; 53/51
[51] Int. Cl.² ....................................... B65B 31/02
[58] Field of Search ............... 53/112 A, 112 R, 51

[56] References Cited
UNITED STATES PATENTS

| | | | |
|---|---|---|---|
| 3,555,768 | 1/1971 | Miller | 53/51 X |
| 3,744,210 | 7/1973 | O'Lenick et al. | 53/112 A X |

Primary Examiner—Travis S. McGehee
Attorney, Agent, or Firm—Woodhams, Blanchard and Flynn

[57] ABSTRACT

A device for controlling the speed of sheet materials which are fed to a deep-drawing station in a packaging machine. The sheets are advanced by the control device in a step-by-step manner toward the deep-drawing station. The speed of the motor is controlled in a step-by-step manner by a rotating cam member engaging either a part of the conveyor for the sheet material to measure a predefined length of movement by the conveyor for the material. The motor is started slowly so that the sheet material is accelerated slowly to a maximum speed and is thereafter decreased slowly in speed until it is stopped by reason of the measuring reaching the predefined limit.

6 Claims, 3 Drawing Figures

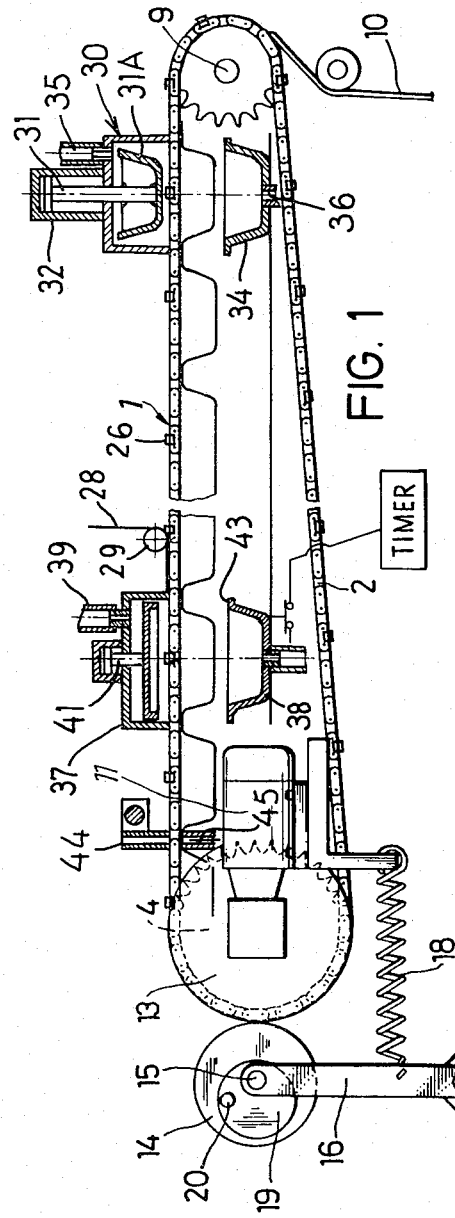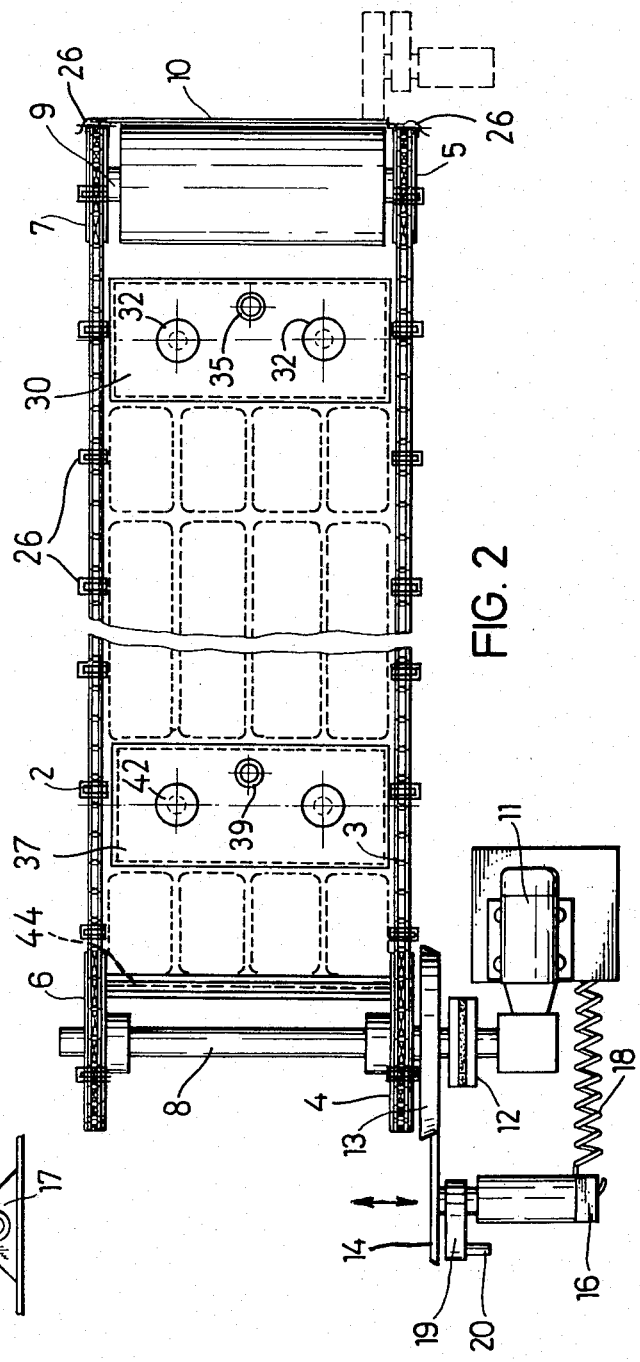

PACKAGING MACHINE

This is a continuation-in-part application of U.S. Ser. No. 591,862, filed June 30, 1975, now abandoned.

FIELD OF THE INVENTION

The invention relates to a packaging machine having a deep-drawing station for the manufacture of the lower parts of the packages from an endless lower sheet, a vacuum chamber for evacuating and closing the packages with an upper sheet, a control for the stepwise advance of the sheets and having two motor driven endless chains having clamps thereon for engaging and transporting the lower sheet along one edge.

BACKGROUND OF THE INVENTION

The packages are manufactured from endless sheets by deep-drawing. Depending on the purpose for use of the packages, they consist, for example, alone of the deep-drawn lower sheet, which is closed off by the nondeformed upper sheet. However, it is also conceivable to deep-draw both the lower sheet and also the upper sheet to form a package. The packages are manufactured from the endless sheet at a deep-drawing station, in which at least several packages can be manufactured during one sequence of operation. These are still connected by the sheet. The thus formed packages are then transported by a stepwise forward movement of the sheet to a vacuum chamber, in which they are evacuated and closed off by the upper sheet. The deep-drawing station and the vacuum chamber are spaced a certain distance from one another, so that the goods can be placed into the packages formed in the lower sheet.

The sheets are gradually moved forwardly, namely in stepped increments at a rate corresponding to the rate that the already manufactured packages are being guided out of the deep-drawing station. The distance of the deep-drawing station from the vacuum chamber amounts generally to approximately 10 steps. The vacuum chamber must thus be spaced a very certain distance from the deep-drawing station and the step-by-step advance of the sheet must be carried out in exactly equal steps. If, for example, the respective steps differ only by some millimeters from the prescribed nominal value, the difference caused by this amounts at the level of vacuum chamber after 10 steps already to about 10 millimeters. The consequence is that the packages are no longer exactly guided into the vacuum chamber and during the driving together of the two halves of the vacuum chamber, the packages can be crushed and welding occurs at incorrect locations. The exact step-by-step advance of the sheets causes difficulties because, among other reasons, the sheet which is driven by the chains expands and thus the chain advance does not always correspond with the sheet advance.

Further, and in order to avoid too much stress of the foil and an overflowing of the goods from the packages, the sheet must slowly start to drive and slowly stop at each steplike advance. These requirements are not met satisfactorily with the known packaging machines.

The basic purpose of the invention is to construct a packaging machine of the above-mentioned type wherein the step-by-step advance of the sheets can be adjusted and precisely maintained, wherein the advancing speed has an approximately sinusoidal form and wherein the control device of the packaging machine is inexpensive to manufacture.

This purpose is attained inventively by providing a measuring wheel of a certain circumference to determine the magnitude of the advance of the sheets, which measuring wheel has a trip cam and by coupling with said measuring wheel a cam or impulse disk, with which the speed of the motor is controlled in dependency of the advance movement. When the measuring wheel is driven directly by the sheet, only the effective advance of the sheet is measured, so that possibly occurring expansions of the sheet may remain unconsidered. The cam disk is, according to a further suggestion of the invention, scanned by a potentiometer of a speed governor. The cam disk may be of any desired shape, so that the form or pattern of the speed during one step can be adjusted to the goods which must be transported and to the condition of the sheet.

The step length is changed inventively by changing the diameter of the measuring wheel.

BRIEF DESCRIPTION OF THE DRAWINGS

One exemplary embodiment of the invention will be described more in detail hereinafter in connection with the drawings, in which:

FIG. 1 is a side view of the drive and control device of an inventive packaging machine;

FIG. 2 is a top view of the exemplary embodiment shown in FIG. 1; and

DETAILED DESCRIPTION

Figure 3:
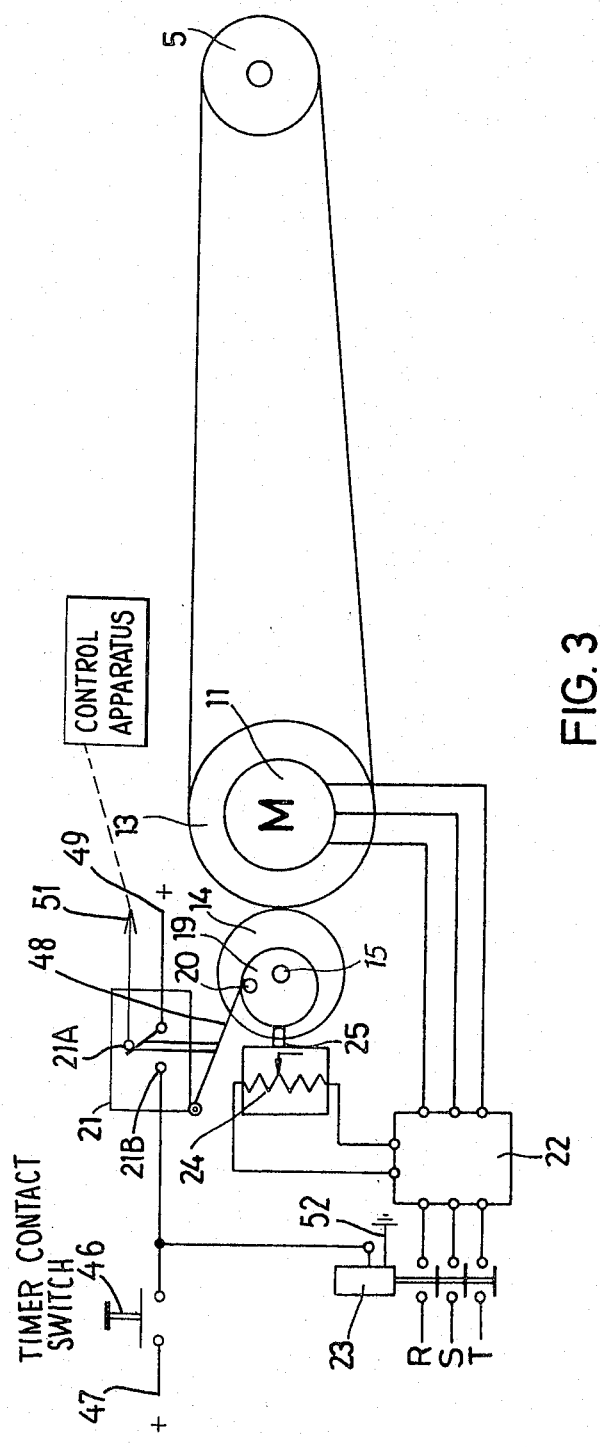
FIG. 3 shows details of the control device for the stepwise advance of the sheets.

FIGS. 1 and 2 illustrate a drive 1 for a packaging machine. The drive 1 consists of two endless chains 2,3 which are guided over sprockets 4 to 7, inclusive. The sprockets 4,6 are arranged on a common shaft 8 and the sprockets 5,7 are arranged on a common shaft 9.

The chains 2,3 have at certain intervals clamps 26, into which the sheet identified with reference numeral 10 is hung. A gear motor 11 is mounted on a frame and provided for driving the chains 2,3. The gear motor 11 is connected to the shaft 8 of the sprockets 4 and 6 through a coupling member 12.

The shaft 8 furthermore drives a wheel 13. A measuring wheel 14, rotatable about an axis of a shaft 15, engages the bevelled periphery of the wheel 13 and rolls thereover. The measuring wheel 14 is mounted on a lever 16 which is hinged to a console 17. A spring 18 engages the lever 16 and urges the measuring wheel 14 against the wheel 13. The measuring wheel 14 is movable in the direction of the double arrow A to effect a change in the speed of rotation of the wheel 13 by reason of the wheel 14 engaging a different diameter portion of the wheel 13. A cam disk 19 is also arranged on the shaft 15, which cam disk carries a trip cam 20.

The packages 27 are formed of a lower foil 10 and an upper foil 28. The upper foil is fed from above to the packaging machine and is guided over a guide roller 29 to extend parallel with and at a small vertically spaced distance from the lower foil 10. In a deep-drawing station 30, the lower foil 10 is deformed into the shape of a container. The deep-drawing station 30 is constructed in two parts and consists of an upper die 31A which is secured on the lower end of a piston rod 31 of a cylinder 32 and cooperates with a movably arranged matrix 34. The upper die 31A and also the matrix 34 are connected each to an underpressure line 35,36, to eliminate air entrapments during deformation of the foil 10.

An evacuating chamber 37 is spaced from the deep-drawing station 30 and is constructed of an upper part 40 and lower part 38. The lower part 38 is movably arranged in the vertical direction. The containers are evacuated in the evacuating chamber through an underpressure line 39 prior to a welding of lower foil 10 to the upper foil 28. To weld together the lower foil 10 and upper foil 28, the upper part or welding frame 40 is used and is movably carried by two piston rods 41 of a cylinder 42. The welding frame 40 rests on the upper edge 43 of the lower chamber 38 during a welding of lower and upper foils.

The vacuum chamber 37 is followed by a cutting device 44, having a vertically movable knife 45 which serves to separate the individual packages 27. Only one cross cut is illustrated in FIG. 1. However, it is also conceivable to construct the cutting device so that all of the individual packages are separated.

In FIG. 3, the same component parts have been identified with the same reference numerals as were used above. The trip cam 20 operates a switch 21 having contacts 21A and 21B. The switch 21 controls the energizing and deenergizing of a solenoid 23 through the contact 21B. The solenoid 23 controls the power to a speed governor 22 from the power lines R,S,T. The line 52 from the solenoid 23 is connected to ground. The motor 11 is controlled by the speed governor 22 in accordance with the signals received from a potentiometer 24. The potentiometer 24 has a key head 25, which rests on the peripheral surfaces of the cam disk 19. The speed of the motor 11 can be increased or decreased as desired through the cam disk 19, potentiometer 24 and speed governor 22. The change in speed is preferably sinusoidal.

The device operates as follows:

The deep-drawing station 30 and the evacuating chamber 37 are opened synchronously and always when one operation has been concluded, namely when a package has been sealed. When the chamber halves are driven apart, one of the two chamber halves 38 closes a limit switch 50 to energize a timer. A switch 46 is closed in response to an energizing of the timer so that the solenoid 23 is energized for a certain time period by the potential on line 47. The speed governor 22 is connected to the power lines R,S,T by operation of the solenoid, so that the motor 11 becomes energized. At the same time, the measuring wheel 14 is driven so that the cam 20 becomes disengaged from the lever 48 of the switch 21. The switch 21 connects then the voltage on the line 49 through contact 21B to the solenoid 23. At this point in time, the timer times out to open the switch 46. The motor 11 will continue to rotate as long as the cam 20 does not separate the solenoid 23 from the line 49. During this time, the foil 10 has been pulled forwardly for one step. The cam 20 eventually effects a switching of the armature of the switch 21 to connect the line 49 to the contact 21A and the line 51 to effect a deenergization of the motor 11 and give an impulse to control apparatus for the remaining operations of the packaging machine, as for example the operation of the deep-drawing stations, of the evacuation and/or the cutting operation. All these functions are timed and synchronized with respect to one another. The operation of the cutting device can take place at any time when the foil stands still, such as, for example, immediately after the motor has been switched off.

The measuring wheel 14 may also directly engage the sheet 10, as is illustrated by broken lines in FIG. 2. In this arrangement of the measuring wheel errors, as they may occur for example by expansion of the chains, do not effect the measuring result. The deep-drawing station for forming the containers just like the vacuum chamber for evacuating and closing the containers is not shown for clarity purposes.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a packaging machine having a deep-drawing station for the manufacture of the lower parts of the packages from an endless lower sheet, a vacuum chamber for evacuating and closing the packages with an upper sheet, a control for the stepwise advance of the sheets and having two endless chains having clamps thereon for engaging and transporting the lower sheet at its edges, which chains are driven by a motor, the improvement comprising a measuring wheel having a certain circumference, a trip cam rotatable with said measuring wheel to effect a shutting off of said motor after a predetermined rotatable movement of said measuring wheel, and a cam disk coupled with said measuring wheel, a motor speed control device engaged by said cam disk to control the speed of the motor in relationship to the advance movement of said sheet.

2. The improvement according to claim 1, wherein said measuring wheel is driven by the sheet.

3. The improvement according to claim 1, wherein said measuring wheel is frictionally driven by a drive wheel connected to the support for said endless chain.

4. The improvement according to claim 1, wherein said speed control device is a potentiometer of a speed governor circuit.

5. The improvement according to claim 1, wherein said motor is a stepping motor.

6. The improvement according to claim 1, including means for adjusting the magnitude of the steps.

* * * * *